(12) United States Patent
Gupta

(10) Patent No.: US 10,400,159 B2
(45) Date of Patent: Sep. 3, 2019

(54) COMPOSITE COMPRISING WELL TREATMENT AGENT AND/OR A TRACER ADHERED ONTO A CALCINED SUBSTRATE OF A METAL OXIDE COATED CORE AND A METHOD OF USING THE SAME

(71) Applicant: Baker Hughes Incorporated, Houston, TX (US)

(72) Inventor: D. V. Satyanarayana Gupta, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 221 days.

(21) Appl. No.: 15/326,626

(22) PCT Filed: Jul. 15, 2015

(86) PCT No.: PCT/US2015/040519
§ 371 (c)(1),
(2) Date: Jan. 16, 2017

(87) PCT Pub. No.: WO2016/014310
PCT Pub. Date: Jan. 28, 2016

(65) Prior Publication Data
US 2017/0198210 A1    Jul. 13, 2017

Related U.S. Application Data

(60) Provisional application No. 62/028,151, filed on Jul. 23, 2014.

(51) Int. Cl.
| | | |
|---|---|---|
| C09K 8/80 | (2006.01) |
| C09K 8/528 | (2006.01) |
| E21B 43/04 | (2006.01) |
| E21B 43/267 | (2006.01) |
| C09K 8/524 | (2006.01) |
| C09K 8/536 | (2006.01) |
| C09K 8/60 | (2006.01) |
| C09K 8/70 | (2006.01) |
| C09K 8/92 | (2006.01) |
| C04B 35/628 | (2006.01) |
| E21B 37/06 | (2006.01) |
| E21B 43/26 | (2006.01) |
| E21B 47/10 | (2012.01) |

(52) U.S. Cl.
CPC ........ C09K 8/805 (2013.01); C04B 35/62807 (2013.01); C04B 35/62813 (2013.01); C09K 8/524 (2013.01); C09K 8/528 (2013.01); C09K 8/536 (2013.01); C09K 8/602 (2013.01); C09K 8/605 (2013.01); C09K 8/70 (2013.01); C09K 8/92 (2013.01); E21B 37/06 (2013.01); E21B 43/04 (2013.01); E21B 43/26 (2013.01); E21B 43/267 (2013.01); E21B 47/1015 (2013.01); C04B 2235/5409 (2013.01); C04B 2235/5427 (2013.01); C09K 2208/22 (2013.01); C09K 2208/26 (2013.01); C09K 2208/32 (2013.01)

(58) Field of Classification Search
CPC .... C09K 8/528; C09K 8/805; C09K 2208/22; C09K 2208/26; C09K 2208/32; C09K 8/524; E21B 43/267; E21B 37/06; E21B 43/04; E21B 43/26; E21B 47/1015; E21B 43/16
See application file for complete search history.

(56) References Cited

U.S. PATENT DOCUMENTS

| | | | |
|---|---|---|---|
| 1,570,537 | A | 1/1926 | Teitsworth |
| 2,378,155 | A | 6/1945 | Newsome |
| 3,179,170 | A | 4/1965 | Burtch et al. |
| 3,283,817 | A | 11/1966 | Roberts |
| 3,782,469 | A | 1/1974 | Fulford |
| 3,850,248 | A | 11/1974 | Carney |
| 4,013,587 | A | 3/1977 | Fischer et al. |
| 4,108,779 | A | 8/1978 | Carney |
| 4,109,721 | A | 8/1978 | Slusser |
| 4,352,741 | A | 10/1982 | Wernau |
| 4,390,456 | A | 6/1983 | Sanchez et al. |
| 4,552,591 | A | 11/1985 | Millar |
| 4,582,131 | A | 4/1986 | Plummer et al. |
| 4,660,645 | A | 4/1987 | Newlove et al. |

(Continued)

FOREIGN PATENT DOCUMENTS

| | | |
|---|---|---|
| CA | 1262507 | 10/1989 |
| EP | 0540204 A2 | 5/1993 |

(Continued)

OTHER PUBLICATIONS

P.J.C. Webb AEA Technology PLC, T.A., et al; Revolutionary New Chemical Delivery System for Fractured, Gravel Packed and Prepacked Screen Wells; SPE 38164; 1997.

(Continued)

Primary Examiner — Zakiya W Bates
(74) Attorney, Agent, or Firm — John Wilson Jones; Jones Delflache LLP

(57) ABSTRACT

A composite used to slowly release well treatment agents and/or tracers into a well contains a calcined substrate comprising a metal oxide coated onto at least a portion of a core and a well treatment agent adsorbed onto or absorbed into the interstitial spaces of the metal oxide coating of the calcined substrate. The core contains a material sufficient in strength to prevent closure of a fracture created or enlarged within a subterranean formation penetrated by the well at in-situ reservoir conditions.

24 Claims, No Drawings

(56) References Cited

U.S. PATENT DOCUMENTS

| | | |
|---|---|---|
| 4,670,166 A | 6/1987 | McDougall et al. |
| 4,738,897 A | 4/1988 | McDougall et al. |
| 4,905,762 A | 3/1990 | Zilch |
| 4,986,353 A | 1/1991 | Clark et al. |
| 5,073,276 A | 12/1991 | Newlove et al. |
| 5,102,558 A | 4/1992 | McDougall et al. |
| 5,187,011 A | 2/1993 | Manalastas et al. |
| 5,224,543 A | 7/1993 | Watkins et al. |
| 5,225,123 A | 7/1993 | Torobin |
| 5,741,758 A | 4/1998 | Pakulski |
| 5,758,725 A | 6/1998 | Streetman |
| 5,893,416 A | 4/1999 | Read |
| 5,922,652 A | 7/1999 | Kowalski et al. |
| 5,964,291 A | 10/1999 | Bourne et al. |
| 6,025,302 A | 2/2000 | Pakulski |
| 6,209,643 B1 | 4/2001 | Nguyen et al. |
| 6,209,646 B1 | 4/2001 | Reddy et al. |
| 6,279,656 B1 | 8/2001 | Sinclair et al. |
| 6,326,335 B1 | 12/2001 | Kowalski et al. |
| 6,331,508 B1 | 12/2001 | Pakulski |
| 6,380,136 B1 | 4/2002 | Bates et al. |
| 6,439,310 B1 | 8/2002 | Scott, III et al. |
| 6,527,051 B1 | 3/2003 | Reddy et al. |
| 6,613,899 B1 | 9/2003 | Kuzzee et al. |
| 6,723,683 B2 | 4/2004 | Crossman et al. |
| 6,866,797 B1 | 3/2005 | Martin et al. |
| 7,028,776 B2 | 4/2006 | Kirk |
| 7,270,184 B2 | 9/2007 | Kolter et al. |
| 7,419,937 B2 | 9/2008 | Rimmer et al. |
| 7,426,961 B2 | 9/2008 | Stephenson et al. |
| 7,459,209 B2 | 12/2008 | Smith et al. |
| 7,491,682 B2 | 2/2009 | Gupta et al. |
| 7,493,955 B2 | 2/2009 | Gupta et al. |
| 7,494,711 B2 | 2/2009 | Kaufman et al. |
| 7,598,209 B2 | 10/2009 | Kaufman et al. |
| 7,686,081 B1 | 3/2010 | Becker |
| 9,029,300 B2 | 5/2015 | Gupta |
| 9,102,860 B2 | 8/2015 | Cawiezel et al. |
| 2002/0128157 A1 | 9/2002 | Bates et al. |
| 2004/0043906 A1 | 3/2004 | Heath et al. |
| 2004/0060702 A1 | 4/2004 | Kotlar et al. |
| 2004/0074646 A1 | 4/2004 | Kotlar et al. |
| 2004/0224155 A1 | 11/2004 | Barron et al. |
| 2004/0244969 A1 | 12/2004 | Koltar et al. |
| 2005/0022991 A1 | 2/2005 | Rao |
| 2005/0028976 A1 | 2/2005 | Nugyen et al. |
| 2005/0034868 A1 | 2/2005 | Frost et al. |
| 2005/0115710 A1 | 6/2005 | Koltar et al. |
| 2006/0065396 A1 | 3/2006 | Dawson et al. |
| 2006/0091572 A1 | 5/2006 | Santra et al. |
| 2006/0124301 A1 | 6/2006 | Gupta |
| 2006/0124302 A1 | 6/2006 | Gupta |
| 2007/0036977 A1 | 2/2007 | Sinclair et al. |
| 2007/0095528 A1 | 5/2007 | Ziauddin et al. |
| 2007/0173417 A1 | 7/2007 | Kaufman et al. |
| 2007/0202318 A1 | 8/2007 | Smith et al. |
| 2008/0035339 A1 | 2/2008 | Welton et al. |
| 2008/0035340 A1 | 2/2008 | Welton et al. |
| 2008/0053657 A1 | 3/2008 | Alary et al. |
| 2008/0058228 A1 | 3/2008 | Wilson |
| 2008/0058229 A1 | 3/2008 | Berkland et al. |
| 2008/0078547 A1 | 4/2008 | Sinclair et al. |
| 2008/0182765 A1 | 7/2008 | Pershikova et al. |
| 2008/0217012 A1 | 9/2008 | Delorey et al. |
| 2008/0287324 A1 | 11/2008 | Pursley et al. |
| 2009/0114247 A1 | 5/2009 | Brown et al. |
| 2009/0131285 A1 | 5/2009 | Wang et al. |
| 2009/0291861 A1 | 11/2009 | Sawdon |
| 2009/0308610 A1 | 12/2009 | Windebank et al. |
| 2009/0325825 A1 | 12/2009 | Gupta et al. |
| 2010/0059224 A1 | 3/2010 | Palamara et al. |
| 2010/0175875 A1 | 7/2010 | Becker et al. |
| 2012/0012326 A1 | 1/2012 | Darby et al. |
| 2012/0252706 A1 | 10/2012 | Steiner |
| 2012/0273197 A1* | 11/2012 | Gupta ................. C04B 38/009 |
| | | 166/278 |
| 2012/0318515 A1 | 12/2012 | Cawiezel et al. |
| 2013/0029883 A1 | 1/2013 | Dismuke et al. |
| 2013/0126158 A1 | 5/2013 | Gupta et al. |
| 2015/0330197 A1 | 11/2015 | Brannon et al. |
| 2016/0030916 A1 | 2/2016 | Shen et al. |
| 2017/0350236 A1 | 12/2017 | Shen et al. |

FOREIGN PATENT DOCUMENTS

| | | |
|---|---|---|
| GB | 2298440 | 9/1996 |
| GB | 2520018 | 5/2015 |
| WO | 99/36668 A1 | 7/1999 |
| WO | 99/54592 | 10/1999 |
| WO | 200011949 A1 | 3/2000 |
| WO | 2002040827 A1 | 5/2002 |
| WO | 2005/017313 A1 | 2/2005 |
| WO | 2006129258 A1 | 12/2006 |
| WO | 2008032067 A1 | 3/2008 |
| WO | 2016014310 A1 | 1/2016 |

OTHER PUBLICATIONS

P.J.C. Webb AEA Technology PLC, T.A., et al; Economic and Technical Advantages of Revolutionary New Delivery System for Fractured and Gravel Packed Wells; SPE 38548; 1997.

P.J.C. Webb AEA Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

Norris, et al; Maintaining Fracture Performance Through Active Scale Control; SPE 68300; 2001.

Norris, et al; Hydraulic Fracturing for Reservoir Management Production Enhancement, Scale Control and Asphaltine Prevention; SPE 71655; 2001.

McInnich, et al; New Relationship Between Oil Company and Service Company Rejuvenates a Mature North Sea Gas Field; SPE 78327; 2002.

Szymczak, et al; Long-Term Scale Inhibition Using a Solid Scale Inhibitor in a Fracture Fluid; SPE 102720; 2006.

Gupta, et al; Solid Production Chemicals Added With the Frac for Scale, Paraffin and Asphaltene Inhibition; SPE 119393; 2009.

Gupta, et al; Multi-Year Scale Inhibition from a Solid Inhibitor Applied during Stimulation; SPE 115655; 2008.

Smith, et al; Solid Paraffin Inhibitor Pumped in a Hydraulic Fracture Provides Long-Term Paraffin Inhibition in Permian Basin Wells; SPE 124868; 2009.

Pallanich; Slow-release medication relieves deepwater headache; Offshore Engineer; Aug. 2007.

Szymczak et al; Treat production problems before they occur; E&P; Jul. 2008.

Weirich et al., Field Application of Chemically Treated Substrate in Pre-Packed Well Screen; SPE 141054; Society of Petroleum Engineers; Manama Bahrain, Mar. 2011.

Sasol Germany GmbH; "Boehmite, High Purity Alumina and Hydrotalcite"; Sasol Germany GmbH; Hamburg Germany 2007.

Sasol; "Aluminum Oxied, A1203"; Material Safety Data Sheet; version 1.2; SASOL; Hamburg Germany; Aug. 2007.

Carbo Ceramics "Carbo EconoProp"; Carbo Ceramics; Houston, Texas; 2010.

D.M. Frigo et al; Chemical Inhibition of Halite Scaling in Topsides Equipment; SPE 60191; 2000.

PCT/US2015/040519 Int'l Search Report and Written Opinion, Int'l Bureau of WIPO, dated Jan. 24, 2017.

\* cited by examiner

COMPOSITE COMPRISING WELL TREATMENT AGENT AND/OR A TRACER ADHERED ONTO A CALCINED SUBSTRATE OF A METAL OXIDE COATED CORE AND A METHOD OF USING THE SAME

FIELD OF THE DISCLOSURE

Composites containing at least one well treatment agent and/or tracer adhered onto a calcined substrate may be used in well treatment operations in order to slowly release the well treatment agent and/or tracer into the surrounding environment. The calcined substrate comprises a metal oxide outer coating sintered onto a core; the core being capable of propping open a fracture within a subterranean formation.

BACKGROUND OF THE DISCLOSURE

In a typical hydraulic fracturing operation, a fracturing fluid containing a solid proppant is pumped into a formation penetrated by a wellbore at a sufficient pressure to cause the formation or enlargement of fractures in the reservoir. Typically, the subterranean formation has a plurality of productive zones. During production of fluids from the well, it usually is desirable to establish communication with selected zones such that stimulation treatments do not inadvertently flow into a non-productive zone or a zone of diminished interest. Selective stimulation becomes pronounced as the life of the well declines and productivity of the well decreases.

Reservoir monitoring is used to assess the productivity of zones or formations from which fluids are being produced. In addition, monitoring of produced fluids is important in order to increase efficiency of the fracturing operation. In the past, tracers have been placed in packs in strategic areas within the well. Unfortunately, such monitoring methods of the prior art have a short lifetime following placement of the tracer within the well. In addition, they do not provide a means for controlling the release of the tracer within the well. Alternatives have therefore been sought.

Alternatives have also been sought for introducing well treatment agents into a well such that the well treatment agent may be released over a sustained period of time. Well treatment agents are often used in production wells to prevent the deleterious effects caused by such deposits and precipitates. For instance, scaling in the formation (as well as in production lines downhole) is often controlled by the use of scale inhibitors.

Composites previously used include those wherein a well treatment agent is adsorbed onto a high surface area solid carrier material. Such composites may be used for the slow release of well treatment agents into the formation and the environs. They have been used in various formations including deepwater, tight gas and coal bed methane formations. U.S. Pat. No. 7,686,081 and U.S. Patent Publication No. 2010/0175875 disclose recharging such particles once they are depleted.

Such composites, however, often have an inherent drawback in that they do not exhibit the requisite strength of proppants and thus must usually be mixed at less than 10% by weight of the proppant in the fracture or sand control treatment. Higher loadings result in crushing of the composites translating into a loss of pack conductivity.

Recently, in U.S. Patent Publication No. 2012/0273197, herein incorporated by reference, a composite was disclosed which exhibited the strength of a proppant and which was capable of delivering a well treatment agent for an extended period of time into a treated formation. The cost of producing such composites is quite high. A less expensive alternative has therefore been sought.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a composite for introducing a well treatment agent and/or a tracer into a subterranean formation penetrated by a reservoir is provided. The composite is characterized by a calcined substrate comprising a core which is sufficient in strength to prevent closure of an enlarged or fracture in-situ reservoir conditions. The core is at least partially coated with a metal oxide. The metal oxide coating may be porous or non-porous. The surface area of the calcined metal oxide is between from about 1 $m^2/g$ to about 10 $m^2/g$ and the diameter of the calcined metal oxide is between from about 0.1 to about 3 mm. A well treatment agent and/or tracer are adhered onto the calcined metal oxide coating.

In another embodiment of the disclosure, a composite for introducing a well treatment agent and/or tracer into a subterranean formation penetrated by a reservoir is provided. The composite is characterized by a calcined substrate having a core sufficient in strength to prevent closure of a fracture at in-situ reservoir conditions and a metal oxide coating at least partially coating the core. A well treatment agent and/or tracer are adhered onto at least a portion of the calcined metal oxide coating. Alternatively, where the metal oxide coating is porous, the well treatment agent and/or tracer may be absorbed into the interstitial spaces of the metal oxide coating. The well treatment agent and/or tracer are capable of being continuously released over an extended period of time into the formation fluid contained in the subterranean formation.

In another embodiment of the disclosure, a method of treating a subterranean formation penetrated by a reservoir is provided wherein a composite is pumped into the subterranean formation penetrated by a reservoir. The composite comprises a calcined substrate having a core sufficient in strength to prevent closure of an enlarged or fracture in-situ reservoir conditions. The calcined substrate is further characterized by a metal oxide coating which at least partially covers the core. The surface area of the calcined metal oxide is between from about 1 $m^2/g$ to about 10 $m^2/g$ and the diameter of the calcined metal oxide is between from about 0.1 to about 3 mm. A well treatment agent and/or tracer are adhered onto the metal oxide coating of the calcined substrate. Alternatively, when the metal oxide coating is porous, the well treatment agent may be absorbed into the interstitial spaces of the metal oxide.

In another embodiment of the disclosure, a method of treating a subterranean formation penetrated by a wellbore is provided wherein a composite is pumped into the formation. The composite comprises a calcined substrate composed of a core and a metal oxide. The core is a material sufficient in strength to prevent closure of a fracture at in-situ reservoir conditions. The metal oxide is coated onto at least a portion of the core. A well treatment agent and/or tracer are adsorbed onto or absorbed into the interstitial spaces of at least a portion of the metal oxide coating of the calcined substrate. The well treatment agent and/or tracer are capable of being continuously released over an extended period of time in the formation fluid contained in the subterranean formation.

In another embodiment of the disclosure, a method of stimulating a subterranean formation is provided wherein a well treatment fluid containing a composite is pumped into the formation. The composite comprise a calcined substrate having a core and a metal oxide coating. The core is sufficient in strength to prevent closure of an enlarged or created fracture at in-situ reservoir conditions. The metal oxide is at least partially coated onto the core. The surface area of the metal oxide is between from about 1 $m^2/g$ to about 10 $m^2/g$. and the diameter of the calcined metal oxide is between from about 0.1 to about 3 mm. Where the metal oxide is porous, the pore volume of the porous metal oxide of the calcined substrate is between from about 0.01 to about 0.10 cc/g. The well treatment agent and/or tracer may be adsorbed onto or absorbed into the interstitial spaces of the metal oxide.

In another embodiment, a method of stimulating a subterranean formation is provided wherein a well treatment fluid containing a composite is pumped into the formation. The composite has a calcined substrate having a core sufficient in strength to prevent closure of a fracture at in-situ reservoir conditions. A metal oxide is coated onto at least a portion of the core. A well treatment agent and/or tracer are adsorbed onto at least a portion of the calcined metal oxide coating. When the metal oxide is porous, the well treatment agent and/or tracer may also be absorbed into the interstitial spaces of the porous metal oxide. The well treatment agent and/or tracer are capable of being continuously released over an extended period of time in the formation fluid contained in the subterranean formation.

In another embodiment of the disclosure, a method of inhibiting or controlling the rate of release of a well treatment agent and/or tracer in a subterranean formation or in a wellbore is provided wherein a composite is introduced into the formation or wellbore. The composite comprises a well treatment agent and/or tracer adsorbed onto or into the interstitial spaces of a metal oxide coating. The metal oxide coating is bound to a core sufficient in strength to prevent closure of a fracture at in-situ reservoir conditions. Prior to adsorption or absorption of the well treatment agent and/or tracer onto or within the metal oxide coating, the core and metal oxide coating are sintered. The surface area of the calcined metal oxide is between from about 1 $m^2/g$ to about 10 $m^2/g$; the diameter of the calcined metal oxide is between from about 0.1 to about 3 mm; and, when the metal oxide is porous, the pore volume of the calcined porous metal oxide is between from about 0.01 to about 0.10 cc/g. The well treatment agent and/or tracer adsorbed onto or absorbed within the metal oxide coating of the calcined substrate has a lifetime, from a single treatment, of at least six months.

In another embodiment of the disclosure, a method of inhibiting or controlling the rate of release of a well treatment agent and/or tracer in a subterranean formation or in a wellbore is provided wherein a composite is introduced into the formation or wellbore. The composite comprises a calcined substrate having a core sufficient in strength to prevent closure of a fracture at in-situ reservoir conditions. A metal oxide is coated onto at least a portion of the core. A well treatment agent and/or tracer is adsorbed onto or absorbed into the interstitial spaces of at least a portion of the metal oxide coating. The well treatment agent is capable of being continuously released over an extended period of time in the formation. The well treatment agent and/or tracer adsorbed onto or absorbed within the metal oxide coating of the calcined substrate has a lifetime, from a single treatment, of at least six months.

In another embodiment of the disclosure, a sand control method for a wellbore penetrating a subterranean formation is provided wherein a slurry of a composite is pumped into the wellbore. The composite is placed adjacent the subterranean formation to form a fluid-permeable pack and is capable of reducing or substantially preventing the passage of formation particles from the subterranean formation into the wellbore while allowing passage of formation fluids from the subterranean formation into the wellbore. The composite comprises a calcined substrate of a core material and a metal oxide coating. The surface area of the metal oxide coating of the calcined substrate is between from about 1 $m^2/g$ to about 10 $m^2/g$ and the diameter of the calcined metal oxide is between from about 0.1 to about 3 mm. Where the metal oxide is porous, the pore volume of the metal oxide coating of the calcined substrate may be between from about 0.01 to about 0.10 cc/g. A well treatment agent and/or tracer are adsorbed onto the metal oxide coating of the calcined substrate. Where the metal oxide is porous, the well treatment agent and/or tracer may be absorbed into the interstitial spaces of the metal oxide coating.

In still another embodiment of the disclosure, a sand control method for a wellbore penetrating a subterranean formation is provided wherein a slurry is pumped into the wellbore. The composite is composed of a calcined substrate comprising a core and a metal oxide coated onto at least a portion of the core. A well treatment agent and/or tracer are adsorbed onto at least a portion of the metal oxide coating of the calcined substrate. Where the metal oxide is porous, the well treatment agent and/or tracer may be absorbed into the interstitial spaces of the metal oxide coating. The composite is placed adjacent the subterranean formation to form a fluid-permeable pack capable of reducing or substantially preventing the passage of formation particles from the subterranean formation into the wellbore while allowing passage of formation fluids from the subterranean formation into the wellbore. The well treatment agent and/or tracer are capable of being continuously released over an extended period of time.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. Also, the terms "including" and "comprising" are used herein and in the appended claims in an open-ended fashion, and thus should be interpreted to mean "including, but not limited to . . . ".

A composite may be used for introducing one or more well treatment agent(s), one or more tracer(s) or a mixture of one or more well treatment agent(s) and one or more tracer(s) into a subterranean formation or into the wellbore penetrating the subterranean formation. The composite exhibits the strength of a conventional proppant yet allows for the slow release of one or more well treatment agents and/or tracers into the formation and/or wellbore.

The composite has particular applicability in a treatment operation within an oil well, gas well as well as a geothermal well.

The composite is characterized by a calcined substrate. The calcined substrate has a core and an outer coating covering at least a portion of the core. Typically, all of the surface of the core is covered by the outer coating.

The well treatment agent and/or tracer are slowly released from the metal oxide coating and may be slowly released into the formation and/or into the wellbore at in-situ conditions.

The core of the composite may be any material capable of withstanding the sintering temperatures and conditions as described herein. Preferably, the core of the composite is suitable for propping open a fracture created or enlarged in a hydraulic fracturing operation and to prevent closure of the fracture at in-situ reservoir conditions.

The core may be porous or non-porous.

Examples of suitable cores are conventional proppants including those having an apparent specific gravity (ASG) of the core is typically greater than or equal to 2.45, more typically greater than or equal to 2.65. Such intermediate to high strength proppants include those containing silica, quartz, sand, glass, ceramics, walnut shell fragments, aluminum pellets, nylon pellets, resin-coated sand, synthetic organic particles, glass microspheres, and bauxite. Mixtures of such proppants, including those of different crystalline structures, may also be used. See, for example, U.S. Pat. No. 8,722,188 and U.S. Patent Publication No. 2014/0011658, herein incorporated by reference.

The core may further be an ultra lightweight (ULW) proppant having an ASG less than 2.45. In some instances, the ASG of the ULW proppant may be less than or equal to 2.25, in other cases less than or equal to 2.0, in some cases less than or equal to 1.75, and in other cases less than or equal to 1.25. ULW proppants more easily facilitate the placement of partial monolayers within the formation. In an embodiment, a ULW proppant may be used in admixture with a proppant having an ASG greater than 2.45.

Exemplary of suitable cores include those materials set forth in U.S. Patent Publication Nos. 2007/0209795; 2007/0209794; and 2008/0087429; and U.S. Pat. Nos. 6,364,018, 6,330,916; 6,059,034; 7,426,961; 7,322,411; 7,971,643; 7,931,087; and 7,494,711; all of which are herein incorporated by reference.

Ceramic proppants are often favored in light of their high crush resistance. Such ceramic proppants are typically non-porous. Typically, the proppants may be selected based on the range of closure stresses desired downhole. ULW proppants are typically suitable for use over a closure stress range from less than about 1000 psi to about 7500 psi, while intermediate grade proppants are useful up to about 12,000 psi, and high strength proppants (such as ceramics) can be used at pressures in excess of 12,000 psi.

Typically, the core comprises between from about 1 to about 99% by weight of the composite.

The coating which covers at least a portion of the core is characterized by a water-insoluble metal oxide. The surface area of the coating is such that at least one well treatment agent and/or or tracer may be adsorbed onto the surface of the metal oxide. The metal oxide may be porous or non-porous.

When the metal oxide coating is porous, the porosity and permeability of the porous metal oxide is such that the well treatment agent and/or tracer may also be absorbed into the interstitial spaces of the porous metal oxide.

Typically, the surface area of the metal oxide, upon being sintered, is typically between from about 1 $m^2/g$ to about 10 $m^2/g$, preferably between from about 1.5 $m^2/g$ to about 4 $m^2/g$, the diameter of the calcined metal oxide is typically between from about 0.1 to about 3 mm, preferably between from about 150 to about 1780 micrometers, and, where the metal oxide is porous, the pore volume of the metal oxide may be between from about 0.01 to about 0.10 cc/g.

Suitable nano-sized metal oxides include alumina, zirconium oxide and titanium oxide. In a preferred embodiment, the metal oxide is alumina including alpha-alumina, theta-alumina, delta-alumina, gamma-alumina, chi-alumina or kappa-alumina or a mixture thereof.

The core and metal oxide coating are sintered prior to deposition of the well treatment agent and/or tracer onto the metal oxide coating. The thickness of the metal oxide deposited onto the core of the calcined substrate is typically between from about 1 to about 25 percent of the total particle diameter of the composite.

The calcined substrate is typically insoluble in well fluids under subterranean conditions, such as at temperatures less than about 250° C. and pressures less than about 80 MPa.

The amount of well treatment agent and/or tracer adsorbed onto or within the metal oxide of the calcined substrate is typically between from about 5 to about 50 weight percent, based on the total weight of the composite.

Adsorption of the well treatment agent onto the metal oxide and/or absorption of the well treatment agent into the metal oxide reduces (or eliminates) the amount of well treatment agent required to be in solution during a well treatment operation.

When the well treatment agent and/or tracer is absorbed into the interstitial spaces of the metal oxide coating of the calcined substrate, the well treatment agent and/or tracer may be encapsulated by or immobilized within a matrix (such as an emulsion) or a polymeric material. The matrix may be formed by the polymeric material. Preferably the polymeric material is permeable.

In an embodiment, the polymeric material may be plastic such as polypropylene, polyethylene, high density polyethylene, high density polypropylene, polyethylene terephthalates, polyamides (both aliphatic and aromatic), a liquid crystal polymer or a starch (such as a polysaccharide), lignin, chitin or a mixture thereof. Other materials suitable for encapsulating the well treatment agent include an acrylic, polybutylene, polycarbonate, polyester, polystyrene, polyurethane, polyvinyl chloride, polycaprolactone, polybutylene terephthalate, polyvinyl alcohol, polylactic acid, polyglycolide, polyester amide, polyimides, acrylonitrile-butadiene-styrene, acrylonitrile-styrene-acrylate, polyoxymethylene, polybutylene, polyisobutylene, polyvinylbutyral, epichlorohydrin elastomer, nitrile elastomer, nitrile rubber, polyetherketone, polyetheretherketone, polyetherketoneketone, polymethylmethacrylate, polyethylene oxide, polyphenylene oxide, polysulfones, polyethersulfone, polyurea, chlorinated polyethylene, ethylene-chlorofluoroethylene, tetrafluoroethylene-perfluoropropylene, perfluoroalkoxy, silicon rubbers and other polymeric materials consisting of mixtures of the above and copolymers, terpolymers and hydrophobically/hydrophilically modified and crosslinked derivatives thereof. In addition the polymer can be a wax.

The well treatment agent and/or tracer may be a solid or liquid. Where the well treatment agent and/or tracer is a solid, the well treatment agent and/or tracer may be dissolved in a suitable solvent. The well treatment agent and/or tracer may slowly be released into the produced fluid as it is solubilized. Where the well treatment agent and/or tracer is a liquid, the well treatment agent and/or tracer is slowly released into the produced fluid, the rate of release being dependent upon the surface charges between the well treatment agent and/or tracer and metal oxide coating or the polymeric coating.

The well treatment agent and/or tracer may be desorbed from the calcined porous metal oxide coating into its respective solubilizing liquid and then be effective in fluids within the formation or the wellbore. For example, water soluble well treatment agents and/or tracers may remain intact on the calcined porous metal oxide in the absence of water flow and slowly released in the presence of water. Hydrocarbon soluble well treatment agents may remain intact on the calcined porous metal oxide until they are slowly desorbed into the hydrocarbon phase of produced fluid.

The well treatment agent as well as the tracer is preferably water soluble or soluble in aliphatic and/or aromatic hydrocarbons. In an embodiment, a combination of oil soluble and water soluble well treatment agents and/or tracers may be simultaneously used.

In a preferred embodiment, the well treatment agent may be at least one member selected from the group consisting of demulsifying agents (both water-in-oil and oil-in-water), corrosion inhibitors, scale inhibitors, paraffin inhibitors, gas hydrate inhibitors, salt formation inhibitors and asphaltene dispersants as well as mixtures thereof.

Further, other suitable treatment agents include foaming agents, oxygen scavengers, biocides and surfactants as well as other agents wherein slow release into the production well is desired.

In an exemplary embodiment, the composites having a well treatment agent are used in the treatment of gas wells or oils wells wherein it is desired to inhibit the formation of undesired contaminants, control the formation of undesired contaminants or retard the release of undesired contaminants into the well. For instance, the composite may be used in completion or production services. The composites may be used in the well to remove undesired contaminants from or control the formation of undesired contaminates onto tubular surface equipment within the wellbore.

In a preferred embodiment, the composite effectively inhibits, controls, prevents or treats the formation of inorganic scale formations being deposited in subterranean formations, such as wellbores, oil wells, gas wells, water wells and geothermal wells. The composites are particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

The composite may also be used to control and/or prevent the undesired formation of salts, paraffins, gas hydrates, asphaltenes as well as corrosion in formations or on surface equipment.

Suitable scale inhibitors are anionic scale inhibitors.

Preferred scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylenediaminetetra acetic acid.

The well treatment agent may further be any of the fructans or fructan derivatives, such as inulin and inulin derivatives, as disclosed in U.S. Patent Publication No. 2009/0325825, herein incorporated by reference.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors include, but are not limited to, ethylene/vinyl acetate copolymers, acrylates (such as polyacrylate esters and methacrylate esters of fatty alcohols), and olefin/maleic esters.

Exemplary corrosion inhibitors include but are not limited to fatty imidazolines, alkyl pyridines, alkyl pyridine quaternaries, fatty amine quaternaries and phosphate salts of fatty imidazolines.

Gas hydrate treating chemicals or inhibitors include but are not limited to polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene treating chemicals include homopolymers and copolymers (such as fatty esters of acrylic and methacrylic acid polymers and copolymers) and sorbitan monooleate.

Suitable foaming agents include, but are not limited to, oxyalkylated sulfates or ethoxylated alcohol sulfates, or mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

Suitable tracers include dyes (such as phenoxazone dyes, fluroescein, pyridinium betaines dyes, solvatochromatic dyes, Oregon Green, Cascade Blue, Lucifer yellow, Auramine O, tetramethylrhodamine, pysranine, sulforhodamines, hydroxycoumarins; polysulfonated pyrenes; cyanines, hydroxylamines, neutral red, acridine orange), gases (such as helium and carbon dioxide); acids (such as picric acid and salicylic acid) or salts thereof; ionizable compounds (such as those which provide ammonium, boron, chromate, etc., ions); and radioactive materials (such as krypton-85); isotopes; genetically or biologically coded materials; microorganisms; minerals; and high molecular weight synthetic and natural compounds and polymers (such as oligonucleotides, perfluorinated hydrocarbons like perfluoro butane, perfluoro methyl cyclopentane and perfluoro methyl cyclohexane).

The tracer may also be a chelate, such as ethylenediaminetetraacetic acid (EDTA)) or a salt thereof. U.S. Pat. No. 4,264,329, herein incorporated by reference, discloses acceptable metal chelates formed by reacting aryl substituted ethylenediaminetetraacetic acid and a metal ion selected from the consisting of lead, cadmium and zinc. Such chelates react with fluorogenic agents, such as fluorescamine and o-phthalaldehyde. Fluorescence spectroscopy is then used to detect the chelate.

The metal oxide may be applied onto the core material as gel particles. The gel particles may be prepared by first mixing a hydrosol of the metal oxide which contains a hydrate of the metal oxide (such as alumina) or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture. The mixture may then be introduced in dispersed form into a water-immiscible liquid having a temperature of from about 60° to 100° C., whereby gel particles are formed. The gel particles may be aged in the liquid at the temperature and subsequently in an aqueous base, such as an aqueous ammonia solution and aged particles recovered. The gel particles may then be applied onto the core material. The gel particles may be applied onto the core material in a binder. The pre-cursor composite comprising the core material and gel particles may then be sintered. During sintering, the additive component is removed. In addition, combustion of the additive component during sintering of the gel particles results in formation of pores on the surface of and within the calcined metal oxide. Typically, the weight of the calcined porous metal oxide is between from about 2 to about 25 percent of the total weight of the calcined substrate.

The metal oxide hydrosol may optionally contain a silica-containing substance which in their non-soluble form is coprecipitated with the metal oxide particles. The silica-containing substance is preferably a low density silica, such as that prepared by hydrolysis of silicon tetrachloride in an oxyhydrogen flame and known under the designation pyrogenic silica.

In an embodiment, the metal oxide coating may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined porous metal coating. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined porous metal oxide layer. Optionally, pyrogenic silica may be added to the hydrosol such that the $SiO_2$ content of the calcined porous metal oxide layer amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined porous metal oxide layer. The hydrosol containing the wood flour may then be mixed with a concentrated aqueous solution of hexamethylene tetraamine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. The gel particles may then be applied onto the core and then sintered at a temperature of 600° C. to about 1000° C.

Alternative methods for making suitable metal oxide coatings for addition to the core material are further disclosed in U.S. Pat. No. 4,013,587, herein incorporated by reference.

In a preferred embodiment, when the metal oxide coating is alumina, the metal oxide (adsorbent) may be prepared by hydrolyzing aluminum alkoxides to render nanosized alumina, drying to remove water and then introducing the dried aluminum in a dispersed form into an oil at a temperature of from about 60° to 100° C., whereby gel particles are formed. The gel particles may then be aged in the liquid and subsequently in an aqueous ammonia solution, recovered and then introduced to the core material and calcined. The nanosized alumina layer, when calcined, may have an average diameter in the range from about 0.4 mm to about 1 mm.

In an embodiment, the core of the calcined substrate has a coefficient of thermal expansion and the metal oxide coating has a coefficient of thermal expansion. The coefficient of thermal expansion of the core exceeds the coefficient of thermal expansion of the metal oxide. The core exerts a compressive force on the metal oxide to render the composite.

The composite may also be prepared by applying the metal oxide onto a base of core material to form a pre-cursor composite. Compressive force is then exerted on the core. The core material has a larger coefficient of thermal expansion than the porous metal oxide layer. The resulting product or pre-cursor is subjected to a complete thermal cycle. During the thermal ramp up phase, the pre-cursor composite is heated above the minimum temperature needed to bond the core to the metal oxide and sinter both the core and the porous metal oxide layer. Thus, during the thermal ramp up phase, the core material bonds and shrinks more than the metal oxide layer. During the thermal cool down phase, the core material responds to the reduction in temperature by attempting to shrink more than the metal oxide layer. This results in the core exerting a compressive force on the metal oxide layer.

In a preferred embodiment, the composite may be prepared by forming a spherically shaped non-sintered base of sinterable ceramic and then depositing on the surface of the sinterable ceramic a non-sintered porous metal oxide layer. The pre-formed composite is then exposed to a complete thermal cycle comprising at least a first thermal ramp up phase and a final thermal cool down phase. After the initiation of the first ramp up phase the base shrinks and the metal oxide applies a compressive force to the base. After the initiation of the final cool down phase at least a portion of the metal oxide layer separates from the ceramic.

In another embodiment, a spherically shaped sinterable core (base) may be heated to at least partial sintering. A metal oxide then may be deposited onto the surface of the base, thereby forming a spherically shaped pre-cursor composite. The pre-cursor composite may then be exposed to a complete thermal cycle that exceeds the sintering temperatures of the base and the metal oxide layer. During the thermal cycle the base and the metal oxide bond to one another and contraction of the core exerts a compressive force on the metal oxide layer.

With regard to processing steps and, in particular, during the sintering process, the difference between the temperatures at which the core and oxide metal layer begin to shrink (start of shrinkage) and stop shrinking (termination of shrinkage) may favorably influence or negatively impact the generation of the desired compressive force on the metal oxide layer by the core material. Furthermore, during the latter portion of the sintering process, the difference in the linear change of the core material and the metal oxide versus temperature can be used to exert a compressive force on the metal oxide layer.

Sintering of the metal oxide onto the core material as set forth herein typically occurs at calcinations temperatures greater than or equal to 1200° C. and in most cases at temperatures greater than or equal to 1400° C.

Detailed methods of forming composite materials of two layers differing in thermal expansion coefficients by compressive forces is set forth in U.S. Pat. No. 7,976,949, herein incorporated by reference.

The well treatment agent(s) and/or tracers may be applied onto the calcined substrate by conventional processes, such as electrofusion, spray-drying and pelletization. In a preferred embodiment, the composite may be prepared by placement of the calcined substrate into a dilute solution or suspension of the well treatment agent and/or tracer in a polymeric matrix and permitting the metal oxide to imbibe the well treatment agent and/or tracer. In another embodiment, the composite may be prepared by first adsorbing water onto the metal oxide of the calcined substrate and then introducing the well treatment agent and/or tracer onto the surface of the metal oxide. The product may then be dried at elevated temperatures (for instance, from about 200° F. to about 250° F. until the percent moisture of the resulting product is less than 3 vol. %.

Adsorption of the well treatment agent and/or tracer onto the porous metal oxide and optionally into the interstitial spaces of the oxide reduces (or eliminates) the amount of well treatment agent and/or tracer required to be in solution. Costs of operation are therefore significantly lowered by use of the composites defined herein since an excessive amount of well treatment agent(s) and/or tracer(s) is not present in the composite defined herein.

The amount of well treatment agent and/or tracer in the composite is that amount sufficient to effectuate the desired result over a sustained period of time and may be as low as 1 ppm. Generally, the amount of well treatment agent and/or tracer in the composite is from about 0.05 to about 5 (preferably from about 0.1 to about 2) weight percent based upon the total weight of the composite. Typically the resulting concentration of the well treatment agent and/or tracer in the wellbore is between from about 1 to about 50 ppm and may be as low as 1 ppm. Such small amounts of well treatment agent and/or tracer may be sufficient for up to 1,000 pore volumes.

When placed into a well, the well treatment agent and/or tracer slowly dissolves at a generally constant rate over an extended period of time in the water or hydrocarbons which are contained in the formation and/or well. In light of the physical interaction between the well treatment agent and porous metal oxide, only a small amount of well treatment agent and/or tracer may be released into the aqueous or hydrocarbon medium. For instance, where the well treatment agent is a scale inhibitor, the amount of scale inhibitor released from the composite is that amount required to prevent, or to at least substantially reduce the degree of, scale formation. For most applications, the amount of scale inhibitor released from the well treatment composite may be as low as 0.1 ppm.

The composite therefore permits a continuous supply of the well treatment agent and/or tracer into the targeted area. As the oilfield fluid passes through or circulates around the well treatment composites, the well treatment agent and/or tracer is slowly released (or desorbed) from the calcined porous metal oxide. In so doing, the composites are characterized by time-release capabilities. Gradual desorption of the well treatment agents and/or tracer insures that they are available to produced fluids for extended periods of time. Generally, the lifetime of a single treatment using the composite is between six and twelve months and may be in excess of 3 years and in some cases in excess of 5 years depending upon the volume of water or hydrocarbons produced in the production well and the amount of well treatment agent and/or tracer bound to the calcined porous metal oxide.

The composites defined herein may be employed with carrier or treatment fluids in order to facilitate placement of the composite to a desired location within the formation. In this regard, any carrier fluid suitable for transporting the composite may be used. Well treatment compositions containing the composite may be gelled or non-gelled. In one embodiment, the well treatment composites described herein may be introduced or pumped into a well as neutrally buoyant particles in, for example, a saturated sodium chloride solution carrier fluid or a carrier fluid that is any other completion or workover brine known in the art. Suitable carrier fluids include or may be used in combination with fluids have gelling agents, cross-linking agents, gel breakers, surfactants, foaming agents, demulsifiers, buffers, clay stabilizers, acids, or mixtures thereof.

The carrier fluid may be a brine (such as a saturated potassium chloride or sodium chloride solution), salt water, fresh water, a liquid hydrocarbon, or a gas such as nitrogen or carbon dioxide. The amount of composite present in the well treating composition is typically between from about 15 ppm to about 100,000 ppm.

The composite may further be advantageously employed in liquefied gas and foamed gas carrier fluids, such as liquid $CO_2$, $CO_2/N_2$, and foamed $N_2$ in $CO_2$ based systems.

Well treatment compositions containing the composites may be used in treatment operations near the wellbore in nature (affecting near wellbore regions) and may be directed toward improving wellbore productivity and/or controlling the production of fracture proppant or formation sand. Particular examples include gravel packing and, frac-packs and water packs. Moreover, such particles may be employed alone as a fracture proppant/sand control particulate, or in mixtures in amounts and with types of fracture proppant/sand control materials, such as conventional fracture or sand control particulates. In such applications, the composite may be used in conjunction with a proppant or sand control particulate.

The composite may be used in stimulation treatments as a component of a fracturing fluid, or acidizing fluid, such as an acid fracturing fluid or a matrix acidizing fluid, completion fluids, etc.

The method may be used for monitoring different zones in oil and gas production wells and also for detection or early warning of phenomena such as water breakthrough. Upon production of fluid from the well, the produced fluid can be analyzed to determine productivity within the zone.

When multiple zones are being treated within the wellbore, distinguishable tracers may be introduced into different zones. The distinguishable tracers are selected such that a tracer in a fracturing fluid pumped into one zone is unable to mask the characteristics of a tracer in a fracturing fluid pumped into another zone. The term "zone" as used herein may refer to separate formations within a wellbore or separate areas within a single formation within the wellbore. Since the tracers may be detected in recovered produced fluids, the method described herein does not require downhole equipment for detection. Monitoring of the tracers within produced fluids may be by visual inspection, chemical analysis, standard spectroscopy methods such as infrared, ultraviolet and mass spectroscopy, spectrophotometric methods, chromatography (including liquid chromatography), ultraviolet light, fluorescence spectroscopy, electrochemical detection, infrared, radioactive analysis, x-ray analysis, PCR techniques combined with sequential analysis, electron capture detection or optical fibers. The selected detection method is based on the properties of the tracer in the fracturing fluid. For instance, where the tracer is an aromatic compound, the method of detection is preferably by ultraviolet light. Where the tracer exhibits fluorescence, the detection method may be by fluorescence spectroscopy.

The composite may also be used in any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The calcined porous metal oxide of the composite may further be reactivated or recharged with the well treatment agent and/or tracer after at least a portion of the well treatment agent and/or tracer has been depleted. Such processes are disclosed in U.S. Pat. No. 7,686,081 and U.S. Patent Publication no. 2010/0175875, both of which are herein incorporated by reference.

In an exemplary procedure, an initial charge of the composite may be injected into the wellbore during the well treatment operation, such as by continuous injection, high pressure pumping, etc. Additional amount fluid containing the well treatment agent and/or tracer may be injected into the formation anytime after the initial charge of well treatment agent and/or tracer in the composite has at least partially depleted. Typically, the additional well treatment agent and/or tracer is introduced when the well treatment agent and/or tracer adsorbed onto the porous metal oxide or within the interstitial spaces of the composite has been substantially depleted and the performance level of the well treatment agent and/or tracer in the composite has become unacceptable. The injection of additional well treatment agent and/or tracer may be carried out in the same manner by which the initial composite was charged into the wellbore or any other conventional method of injecting fluids into a wellbore of an oil or gas well. After injection, the wellbore may be pressurized for a time and under conditions sufficient to reactivate the well treatment agent and/or tracer onto the porous metal oxide layer.

What is claimed is:

1. A composite for introducing a well treatment agent, a tracer or a mixture of a well treatment agent and a tracer into a subterranean formation penetrated by a reservoir, the composite comprising:
   (a) a calcined substrate comprising a core sufficient in strength to prevent closure of a fracture at in-situ reservoir conditions and a metal oxide at least partially coated onto the core, wherein:
      (i) the surface area of the metal oxide of the calcined substrate is between from about 1 $m^2/g$ to about 10 $m^2/g$; and
      (ii) the diameter of the calcined metal oxide of the substrate is between from about 0.1 to about 3 mm; and
   (b) a well treatment agent and/or tracer adhered onto the metal oxide coating of the calcined substrate.

2. The composite of claim 1, wherein the thickness of the metal oxide coated on the core is between from about 1 to about 25 percent of the total diameter of the calcined substrate.

3. The composite of claim 1, wherein the amount of well treatment agent and/or tracer adhered to the metal oxide is between from about 5 to about 50 weight percent, based on the total weight of the composite.

4. The composite of claim 1, wherein the metal oxide is porous.

5. The composite of claim 4, wherein the pore volume of the porous metal oxide is between from about 0.01 to about 0.10 cc/g.

6. The composite of claim 4, wherein at least a portion of the well treatment agent and/or tracer is absorbed into the interstitial spaces of the metal oxide coating.

7. The composite of claim 1, wherein the well treatment agent and/or tracer is encapsulated by or immobilized within a permeable polymeric matrix.

8. The composite of claim 1, wherein the well treatment agent and/or tracer are adsorbed onto the surface of the metal oxide.

9. The composite of claim 1, wherein the metal oxide further contains silica.

10. The composite of claim 1, wherein the metal oxide is alumina.

11. The composite of claim 1, wherein the core is selected from the group consisting of silica, quartz, sand, glass, ceramic beads, walnut shell fragments, aluminum pellets, nylon pellets, resin-coated sand, synthetic organic particles, glass microspheres, sintered bauxite, ultra lightweight particulates having an ASG less than or equal to 2.45 or a mixture thereof.

12. The composite of claim 1, wherein the apparent specific gravity (ASG) of the core is greater than 2.65.

13. The composite of claim 1, wherein the calcined substrate is prepared by subjecting the metal oxide coated onto the core at a sintering temperature greater than or equal to 1200° C.

14. The composite of claim 1, wherein the well treatment agent and/or tracer is selected from the group consisting of scale inhibitors, corrosion inhibitors, paraffin inhibitors, salt inhibitors, gas hydrate inhibitors, asphaltene inhibitors, oxygen scavengers, biocides, foaming agent, emulsion breakers and surfactants and mixtures thereof.

15. The composite of claim 1, wherein the tracer is a dye, gas, an acid or a salt thereof; an ionizable compound, radioactive material, an isotope, a genetically or biologically coded material, a microorganism, a mineral, a high molecular weight synthetic or natural compound or polymer, a chelate or a salt thereof or a mixture thereof.

16. A composite for introducing a well treatment agent and/or tracer into a subterranean formation penetrated by a reservoir, the composite comprising:
 (a) a calcined substrate comprising (i) a core sufficient in strength to prevent closure of a fracture at in-situ reservoir conditions; and (ii) a metal oxide coated onto at least a portion of the core;
 (b) a well treatment agent and/or tracer adsorbed onto or into the interstitial spaces of the metal oxide coating of the calcined substrate, wherein the well treatment agent and/or tracer is capable of being continuously released over an extended period of time in the formation fluid contained in the subterranean formation.

17. The composite of claim 16, wherein the surface area of the calcined metal oxide is between from about 1 $m^2/g$ to about 10 $m^2/g$ and/or the diameter of the calcined metal oxide is between from about 0.1 to 3 mm.

18. A method of treating a subterranean formation penetrated by a reservoir which comprises pumping into the reservoir a well treatment fluid comprising the composite of claim 1.

19. The method of claim 18, which comprises subjecting the formation to hydraulic fracturing by pumping the well treatment fluid into the reservoir at a pressure sufficient to initiate or enlarge a fracture.

20. The method of claim 18, further comprising introducing into the reservoir, after at least a portion of the well treatment agent and/or tracer has been depleted from the composite, the well treatment agent and/or tracer in order to recharge or reactivate the porous metal oxide of the calcined substrate.

21. The method of claim 18, further comprising introducing a second well treatment agent and/or tracer into the reservoir after at least a portion of the well treatment agent and/or tracer adhered onto the porous metal oxide of the composite has been depleted, wherein the second well treatment agent and/or tracer is different from the well treatment agent and/or tracer coated onto the composite.

22. A method of stimulating a subterranean formation which comprises pumping into the formation a well treatment fluid comprising the composite of claim 1.

23. A method of inhibiting or controlling the rate of release of a well treatment agent and/or tracer in a subterranean formation or in a reservoir by introducing into the formation or reservoir the composite of claim 1, wherein the well treatment agent and/or tracer coated onto at least a portion of the metal oxide of the calcined substrate has a lifetime, from a single treatment, of at least six months.

24. A sand control method for a reservoir penetrating a subterranean formation, comprising:
 introducing into the reservoir a slurry of the composite of claim 1 and a carrier fluid;
 placing the composite adjacent the subterranean formation to form a fluid-permeable pack capable of reducing or substantially preventing the passage of formation particles from the subterranean formation into the reservoir while allowing passage of formation fluids from the subterranean formation into the reservoir.

* * * * *